United States Patent [19]

Friends et al.

[11] 4,254,248

[45] Mar. 3, 1981

[54] CONTACT LENS MADE FROM POLYMERS OF POLYSILOXANE AND POLYCYCLIC ESTERS OF ACRYLIC ACID OR METHACRYLIC ACID

[75] Inventors: Gary D. Friends, Ontario, N.Y.; Martin F. VanBuren, Chelmsford, Mass.

[73] Assignee: Bausch & Lomb Incorporated, Rochester, N.Y.

[21] Appl. No.: 74,922

[22] Filed: Sep. 13, 1979

[51] Int. Cl.$^3$ .................... C08F 236/20; G02C 7/04
[52] U.S. Cl. ................ 526/279; 204/159.13; 351/160 R; 525/479; 526/282; 528/26
[58] Field of Search ........................ 525/479; 528/26; 526/279, 282

[56] References Cited

U.S. PATENT DOCUMENTS

| | | | |
|---|---|---|---|
| 2,770,633 | 11/1956 | Sommer | 260/448.2 |
| 2,793,223 | 5/1957 | Merker | 260/448.2 |
| 2,865,885 | 12/1958 | deBenneville et al. | 526/282 |
| 2,906,735 | 9/1959 | Speier | 528/26 |
| 2,922,807 | 1/1960 | Merker | 260/448.2 |
| 3,041,362 | 6/1962 | Merker et al. | 260/448.2 |
| 3,041,363 | 6/1962 | Merker et al. | 260/448.2 |
| 3,228,741 | 1/1966 | Becker | 351/160 |
| 3,341,490 | 9/1967 | Burdick et al. | 260/37 SB |
| 3,518,324 | 6/1970 | Polmanteer | 351/160 |
| 3,639,362 | 2/1972 | Duling et al. | 526/282 |
| 3,763,081 | 10/1973 | Holub et al. | 260/37 SB |
| 3,808,178 | 4/1974 | Gaylord | 526/282 |
| 3,878,263 | 4/1975 | Martin | 260/448.2 B |
| 3,996,187 | 12/1976 | Travnicek | 260/37 SB |
| 3,996,189 | 12/1976 | Travnicek | 260/37 SB |
| 4,138,382 | 2/1979 | Polmanteer | 260/29.6 TA |
| 4,153,641 | 5/1979 | Deichert et al. | 528/26 |

FOREIGN PATENT DOCUMENTS

7704136 10/1977 Netherlands.

OTHER PUBLICATIONS

Katz, et al., "Correlations Between Molecular Structure & Some Bulk Properties of Highly Crosslinked Polysiloxanes", *J. Poly. Sci.*, vol. 46, pp. 139-148 (1974).
Katz, et al., "Some Rheological Properties of Highly Crosslinked Polysiloxanes", *J. Polymer Sci.*, vol. 13, pp. 645-658 (1975).
Katz, et al., "Microheterogeneity in Crosslinked Polysiloxanes", *J. Polymer Sci.*, Polymer Chemistry Edition, vol. 16, pp. 597-614 (Mar., 1978).
Piccoli, et al., "Highly Strained Cyclic Paraffin–Siloxanes", *J. Am. Chem. Soc.*, vol. 82, pp. 1883-1885 (Apr. 20, 1960).
Merker, et al., "The Copolymerization of Cyclic Siloxanes", *J. Polymer Sci.*, vol. 43, pp. 297-310 (1960).
Bostick, "Cyclic Siloxanes and Silazanes", *Kinetics and Mechanisms of Polymerization*, vol. 2 (1969), pp. 343-457, Frisch & Regan, ed., Chap. 8.
Bostick, "Interchange Reactions", Silicones, *Chemical Reactions of Polymers*, High Polymer Series, vol. 19 (1964), E. M. Fettes, ed., Chap. 7, p. 525.

*Primary Examiner*—Wilbert J. Briggs, Sr.
*Attorney, Agent, or Firm*—Robert M. Phipps; Frank C. Parker

[57] ABSTRACT

Monomeric polysiloxanes end-capped with activated unsaturated groups polymerized with a comonomer comprising a polycyclic ester of acrylic acid or methacrylic acid to form a soft contact lens is disclosed. These instant polysiloxane copolymer contact lenses have unexpectedly high tear strengths and unexpectedly high modulus of elasticity.

31 Claims, No Drawings

CONTACT LENS MADE FROM POLYMERS OF POLYSILOXANE AND POLYCYCLIC ESTERS OF ACRYLIC ACID OR METHACRYLIC ACID

BACKGROUND OF THE INVENTION

1. Field of the Invention

This invention relates to soft contact lenses made from new copolymers which result in the soft contact lenses having unexpected high tensile modulus of elasticity and tear strength.

It was discovered that the tear strengths and modulus of elasticity properties of certain polysiloxanes could be altered through copolymerization of the polysiloxanes with polycyclic esters of acrylic acid or methacrylic acid.

These contact lenses comprise soft, flexible, fillerless, hydrolytically stable, biologically inert, transparent contact lenses with the capability of transporting oxygen sufficiently to meet the requirements of the human cornea. These contact lenses comprise a polysiloxane monomer $\alpha,\omega$ terminally bonded through divalent hydrocarbon groups to polymerized, free radical polymerizably activated, unsaturated groups copolymerized with monomers comprising isobornyl acrylate, adamantanyl acrylate, dicyclopentadienyl acrylate, menthyl acrylate and isopinocamphyl acrylate, forming a polymer in a cross-linked network having a tensile modulus of elasticity of at least 200 g/mm$^2$ and a tear strength of at least 5 g/mm thickness.

2. Prior Art Statement

U.S. Pat. No. 4,153,641 teaches contact lenses made from polymers and copolymers comprising poly(organosiloxane) polymers and copolymers formed by polymerizing a poly(organosiloxane) monomer $\alpha,\omega$ terminally bonded through divalent hydrocarbon groups to polymerized, free radical polymerizably activated, unsaturated groups forming a polymer in a cross-linked network. Additionally, specific comonomers are disclosed which include lower esters of acrylic and methacrylic acid, styryls and N-vinyl pyrrolidone which may be copolymerized with the above described poly(organosiloxane) monomer to form a copolymer. The instant invention utilizes the same poly(organosiloxane) monomers described above. However, it was unexpectedly discovered that when the polysiloxane monomers described above were polymerized with a monomer comprising a polycyclic ester of acrylic acid or methacrylic acid, a copolymer was formed which had an unexpectedly high tensile modulus of elasticity and an unexpectedly high tear strength as compared with homopolymers made from the above described polysiloxane monomers. Therefore, the instant copolymers are very suitable for use in making soft contact lenses.

U.S. Pat. No. 4,138,382 teaches, in pertinent part, a hydrophilic, water swellable crosslinked copolymer gel. This copolymer gel is a hydrogel, such as, N-vinyl-pyrrolidone crosslinked with a low molecular weight siloxane. The siloxane component is a very small constituent and is present for the purpose of crosslinking. The siloxane is not present in amounts more than about 2 percent by weight. U.S. Pat. No. 4,138,382 does not teach the instant copolymers, much less a contact lens made therefrom.

Dutch Pat. No. 7,704,136 published Oct. 18, 1977, teaches, in pertinent part, a wettable siloxane material for use in making contact lenses. However, '136 teaches that the wettable contact lenses should not absorb water since water absorption, as taught in '136, would cause water to be discharged into the eye when the contact lenses are in use. This is viewed as a disadvantage in '136. The Dutch reference further teaches that a lens should not absorb water since, as taught in '136, such a lens is constantly undergoing changes, such as changing its optical properties. '136 further teaches that the handling of such a lens is difficult because it is swellable and physically weak. However, the instant lenses are made from polysiloxane copolymers which are unexpectedly strong, durable and oxygen permeable. Nowhere does this Dutch reference disclose the instant polysiloxanes or the comonomers reacted with these monomeric siloxanes in order to form the copolymers disclosed herein.

U.S. Pat. No. 3,808,178 discloses, in pertinent part, a polymeric material containing a polymethacrylate backbone with relatively short poly(organosiloxane) ester side chains on the backbone polymer. There is no crosslinking involved in '178 since the monomers disclosed in '178 are monofunctional, i.e., have only one functional group on each monomer. In order to get crosslinking in '178 it is taught at column 5 of '178 that different monomers must be added for crosslinking which have more than one functionality. However, in the instant invention crosslinking is obtained since each siloxane monomer is difunctional, i.e., each siloxane monomer contains two functional groups, most preferably two methacrylate groups which results in crosslinking. Therefore, '178 does not teach the polysiloxane monomers used in the instant invention nor the copolymers made therefrom.

Katz and Zewi, "Correlations Between Molecular Structure and Some Bulk Properties of Highly Cross-linked Polysiloxanes", J. Polymer Sci., Vol. 46, Pages 139–148 (1974) teaches, in pertinent part, that divinyl monomers can be prepared by esterification of the carboxyl terminated compounds with two molecules of a monoester of ethylene glycol and a monoester of acrylic acid. Polymerization can be effected by ultraviolet radiation at room temperature. Also taught is the structure as shown on page 146 of the Katz et al article. If this formula was broken down as it relates to the preferred siloxane comonomer taught in the instant application, the formula would be as follows:

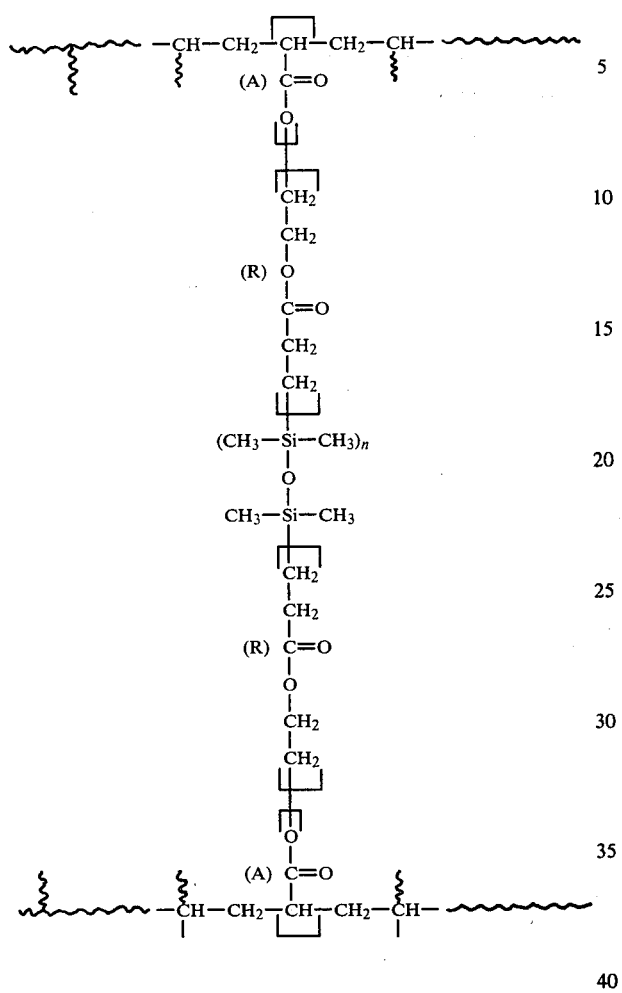

In the above formula the R group has an ester linkage whereas in the instant preferred siloxane comonomer the R is a hydrocarbon group.

Also in the above formula the center repeating unit is a dimethyl siloxane unit whereas the center repeating unit in the instant preferred siloxane comonomers may be a paraffin siloxane repeating unit or a diorganosiloxane repeating unit as illustrated below. The R linkage in the Katz et al paper is not as hydrolytically stable as the hydrocarbon linkage in the instant preferred siloxane comonomer. The ester group in Katz et al can be hydrolyzed. This stability is important if this material is to be used in soft contact lenses or biomedical devices since these types of devices are usually heated in order to disinfect them. As mentioned, if the contact lens loses its shape, then it loses its optics. It should be understood that the instant preferred polysiloxane comonomer does have an ester linkage. However, this linkage is between the A and the R groups. It is actually located in the A group as illustrated below by a formula of one of the most preferred monomeric siloxanes of the instant invention.

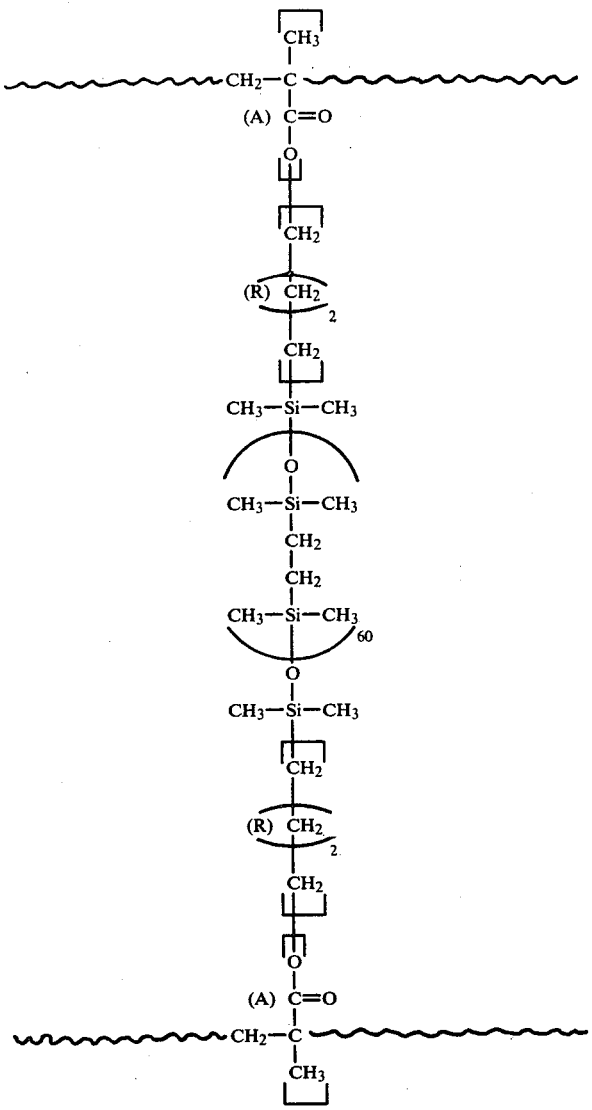

This Katz et al reference, in addition to teaching the specific formula on page 146, merely teaches that phase differences are detectable as the siloxane chain length is decreased. As the siloxane chain increases in length, Katz et al teaches that the phase differences are lost and these differences merge into one continuous transition.

In addition to the above, it is important to note that Katz et al does not suggest any usage for this material.

Katz and Zewi "Some Rheological Properties of Highly Crosslinked Polysiloxanes" *J. Polymer Sci.*, Vol. 13, pages 645-658 (1975) teaches, in pertinent part, the same materials as taught in the above cited (1974) article by Katz et al. This article teaches in more detail the steps necessary in order to make the starting materials for the polymer as taught in the '74 article. Katz et al is teaching in this article, in pertinent part, how to synethesize the carboxyl terminated siloxane. This is illustrated on pages 646-647. Katz et al then crosslinks this using a different chemical reaction than in the instant application in order to make the polymer as shown on page 649. This polymer is not related in any way to the instant materials. In addition to the above, it is important to note that this Katz et al reference also makes no mention of any uses of the material.

Katz and Zewi "Microheterogeneity in Crosslinked Polysiloxane" J. Polymer Sci., Polymer Chemistry Edition, Vol. 16, pages 597-614 (March, 1978) teaches, in pertinent part, the same materials as taught in the above cited (1974) and (1975) articles by Katz et al. The only new material mentioned appears on page 598, line 8, i.e., crosslinked polyesters. However, these crosslinked polyesters are not pertinent to the instant application. Katz et al is teaching in this article, in pertinent part, how to prepare certain monomers. Katz et al is merely suggesting the same crosslinked material as he suggested in his earlier (1974) and (1975) articles. Katz et al then discusses the physical properties and the microheterogeneity of these crosslinked polymers. He discusses the difference in the phase separation on the submicroscopic scale. As to the physical properties, which Katz et al mentioneed in his article on page 597, he discusses the physical properties in general of polysiloxanes. Katz et al discusses specific properties of his polymers at page 609 where he presents modulus-temperature data. Then he discusses crosslinking efficiency on page 607. He is measuring properties which will give him an idea of his efficiency of crosslinking. Again, it should be stated that Katz et al in this (1978) article teaches no more material than he taught in his earlier articles except for the disclosure of the crosslinked polyesters on page 598. However, these material are not relevant to the instant application. In addition to the above, it is important to note that this Katz reference also makes no mention of any uses of this material except as possible sealants.

W. A. Piccoli, G. G. Haberland and R. L. Merker J. Am. Chem. Soc. "Highly Strained Cyclic Paraffin-Siloxanes" Vol. 82, p. 1883-1885 (Apr. 20, 1960) teaches, in pertinent part, the preparation of the cyclic paraffin-siloxane monomers which may be used in the instant invention to make the preferred siloxane prepolymers of the instant invention. These preferred siloxane prepolymers i.e. linear monomers, in the instant invention are copolymerized and crosslinked to form the preferred polymers used for making contact lenses. It is disclosed on page 1884, column 2, lines 15-27, of the above article that these cyclic paraffin-siloxane monomers may be polymerized using strong acids or bases to form linear polymers. The preferred siloxane linear polymers, as mentioned, are used in the instant invention as preferred prepolymers and copolymerized and crosslinked to form materials for making contact lenses. Nowhere does the article disclose or suggest the crosslinked polymers of the instant invention. Neither does the article suggest or disclose that the polymers can be used to make contact lenses.

R. L. Merker and M. J. Scott J. of Polymer Sci., "The Copolymerization of Cyclic Siloxanes" Vol. 43, p. 297-310 (1960) teaches, in pertinent part, copolymerization studies using cyclic alkyl siloxanes. These materials are copolymerized with silethylene siloxane and then the rates of polymerization are determined. The silethylene siloxane is used because it does not equilibrate between the ring form and the linear form. Once the ring form is broken the ring stays open, that is, the reaction is kept going in one direction. The crosslinked polymers of the instant invention are not suggested or taught by this article nor is the use of the polymers as contact lenses taught or suggested.

U.S. Pat. Nos. 3,041,362 and 3,041,363 teach, in pertinent part, the same materials as taught in the above mentioned articles coauthored by Merker in the J. Am Chem Soc. and J. of Polymer Sci. However, in addition, it is taught that some polyfunctional siloxanes may be used with certain monomers to give crosslinked polymers and copolymers. However, the crosslinked copolymers of the instant invention are not taught or suggested by these references nor are the polymers which are taught by these references even relevent to the instant polymers. Further more, it is not taught or suggested by these references that these polymers could be used as contact lenses.

E. E. Bostick, Kinetics and Mechanisms of Polymerization Vol. 2 (1969) Frisch and Regan, ed. Chapter 8 "Cyclic Siloxanes and Silazanes" p. 343-457, teaches, in pertinent part, siloxane polymerization using cyclic siloxanes. This article teaches no more than the above mentioned article from J. of Polymer Sci. by R. L. Merker and M. J. Scott.

E. E. Bostick, Chemical Reactions of Polymers, High Polymers series vol. 19 (1964) E. M. Fettes, ed. chapter 7 "Interchange Reactions" section B "Silicones" p. 525 teaches, in pertinent part, siloxane copolymerization using cyclic siloxanes. It teaches that these reactions go in one direction. This article teaches no more than the above mentioned article from J. of Polymer Sci. by R. L. Merker and M. J. Scott.

U.S. Pat. No. 2,770,633 discloses 1,3-bis(4-methacryloxybutyl) tetramethyl disiloxane, one of the preferred siloxane monomers used in the instant invention. This is taught at column 1, line 63 of '633 when R equals vinyl. However, '633 teaches only the siloxane monomer whereas the instant invention teaches not only the siloxane monomers but the copolymer made from copolymerization of the polysiloxane monomer with a polycyclic ester of acrylic acid or methacrylic acid to form a polysiloxane material for use in making soft contact lenses. The resulting contact lenses have unexpectedly high tensile modulus of elasticity and an unexpectedly high tear strength. '633 would not want the monomer disclosed in '633 to polymerize since it would not perform its intended function as a lubricant if polymerized.

U.S. Pat. Nos. 3,996,187, 3,006,189, 3,341,490 and 3,228,741 disclose, in pertinent part, contact lenses fabricated from poly(organosiloxanes) containing fillers. The tear strength and tensile strength of the contact lenses made from the instant polymer are of sufficient strength so that no fillers are required.

U.S. Pat. Nos. 3,996,187 and 3,996,189, as mentioned above, disclose contact lenses made from reinforced polysiloxanes. The lenses contain various polysiloxanes with index of refraction similar to the silica filler so that an optically clear silica filled silicone elastomer can be formed from aryl and alkyl siloxanes. The material contains from 5 to 20 percent silica. The silica is used, as mentioned, for strength. The instant invention contains no fillers for strength since the instant material has sufficient strength without fillers.

U.S. Pat. No. 3,341,490 discloses contact lenses made from blends of siloxane copolymers containing reinforcing silica fillers. As mentioned, the contact lenses of the instant invention contain no fillers.

U.S. Pat. No. 3,228,741 discloses contact lenses made from silicone rubber particularly hydrocarbon substituted polysiloxane rubber. This silicone material contains fillers such as pure silica to control flexibility, pliability and resiliency of the lenses. The instant polymers require no fillers.

U.S. Pat. No. 3,518,324 teaches vulcanizing to make silicone rubber whereas the instant invention is concerned with contact lenses made from polymerizing specific monomers.

U.S. Pat. No. 3,878,263 teaches one configuration which may be

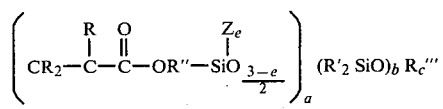

R may be monovalent hydrocarbons.
R' may be a monovalent hydrocarbon.
c may equal zero but when c equals zero then at least one Z must be OR''''.

Z is an important ingredient since this is used to crosslink the chains. Therefore, the siloxane monomers of the instant invention are not taught in '263.

U.S. Pat. No. 2,906,735 teaches a reaction between an alkyl siloxane and acrylic acid or a methacrylic acid resulting in a disiloxane terminated by acrylate groups. '735 does not teach the copolymers of the instant invention.

U.S. Pat. No. 2,922,807 discloses disiloxanes having acryloxy or methacryloxy groups attached to the silicone through a divalent alkylene radical of from 2 to 4 carbon atoms.

U.S. Pat. No. 3,763,081 discloses, in pertinent part, the polymerization of an unsaturated siloxane which is somewhat difficult to polymerize since a double bond in this type of monomer generally is not very active. One must use both high temperatures and a peroxide catalysis or a platinum catalysis in order to complete this type of reaction. See, for example, '081 at column 4 lines 35-46. In the instant preferred reaction the siloxane monomeric materials are referred to specifically as having activated unsaturated groups bonded through a divalent hydrocarbon group to the siloxane whereas '081 has no activated unsaturated groups bonded to the siloxane.

U.S. Pat. No. 2,865,885, in pertinent part, teaches a vinyl group which is not activated as shown in column 1, lines 25-30 of '885. The reason '885's double bond is not "active" in the sense as defined in the instant application is that the double bond is bonded to either sulfur or oxygen. In the instant invention, as to the siloxane monomers, this same position would have a

carbonyl group. This would make the double bond active, in the instant siloxane monomers, as defined in the instant application. Therefore, '885 since the reactivity ratios are so different i.e. the double bond is not active in '885 as defined in the instant invention, it would be very difficult to get an acceptable copolymerization reaction using the formulae of '885 as compared to the active double bond in the instant siloxane monomers which are easily copolymerized. In the instant invention the vinyl groups are "activated" to facilitate free radical polymerization. The formula given at column 1, lines 25-30 of '885 does not lend itself to free radical polymerization due to the lack of resonance but rather it lends itself to ionic polymerization due to the polar nature of the substituents. Therefore, it would be extremely difficult, if at all possible, for '885 to form the compounds of the instant invention. Also, the compounds formed in '885 are not hydrolytically stable because of the presence of the silicone-nitrogen bond in the formula. The instant invention cannot use a hydrolytically unstable compound. Furthermore, the products of this hydrolysis in '885 could be injurious to the human eye particularly the amines. Also at column 3 of '885 the linkage is an amine linkage to the double bond and in the instant invention this linkage is always an alkyl. Therefore, '885 doe not teach the instant siloxane monomers much less the instant copolymers.

U.S. Pat. No. 2,793,223 teaches, in pertinent part, at Example 5 at column 3, lines 30-41 that a phenyl group is attached to the siloxane. Therefore, that material would be very hard and opaque. This would be unsuitable for contact lenses which must be transparent. Furthermore, contact lenses made from the polymers made from the monomers disclosed in '223, because of the presence of the phenyl group on the siloxane as shown in Example 5 of '223, would not transport oxygen sufficiently whereas contact lenses made from the instant polymers would transport oxygen sufficiently to meet the requirements of the human cornea.

SUMMARY OF THE INVENTION

The instant invention provides materials which can be used for biomedical devices, such as, contact lenses, heart valves and intraocular lenses.

The instant invention comprises a soft, flexible, fillerless, hydrolytically stable, biologically inert, transparent contact lens with the capability of transporting oxygen sufficiently to meet the requirements of the human cornea. The instant contact lens is prepared from a material comprising a polysiloxane monomer $\alpha,\omega$ terminally bonded through divalent hydrocarbon groups to polymerized, free radical polymerizably activated, unsaturated groups copolymerized with a polycyclic ester of acrylic acid or methacrylic acid forming a copolymer in a crosslinked network having a tensile modulus of elasticity of from about 200 g/mm$^2$ to about 100,000 g/mm$^2$ with tear strength of from about 5.0 g/mm to about 250 g/mm thickness.

Contact lenses made from (PMMA) polymethyl methacrylate or (PHEMA) polyhydroxyethylmethacrylate are not oxygen permeable enough to meet all the requirements of the human cornea. Therefore, a material had to be developed which was soft for comfort and also oxygen permeable to the extent that when made into a contact lens sufficient oxygen would pass through the material to meet all the requirements of the human cornea. It was found the polysiloxane materials are oxygen permeable to the extent that oxygen will pass through these materials sufficiently to meet the requirements of the human cornea when these materials are used to make contact lenses. Also contact lenses made from polysiloxanes are soft, resulting in more comfort for the wearer. Therefore, it was found that polysiloxane materials would be good candidates for making soft contact lenses.

The polycyclic esters of acrylic acid or methacrylic acid of the instant invention include isobornyl acrylate, adamantanyl acrylate, dicyclopentadienyl acrylate, and isopinocamphyl acrylate.

The use of these polycyclic esters of acrylic acid or methacrylic acid as monomers in making the instant copolymers it is believed maintains clarity in the copolymers over a wide range of concentrations. When many other monomers are used the optical clarity of the copolymers are not maintained.

Tear strength of the copolymers is dramatically and unexpectedly increased by the use of these monomers of polycyclic esters of acrylic acid or methacrylic acid. The increase of tear strength of the instant copolymer over the homopolymers of the polysiloxanes made from the polysiloxane monomers disclosed herein is about 10 times greater. The tensile strength is increased about 2 to 10 times greater in the instant copolymers as compared to the polysiloxane homopolymers.

The increase in tear strength means that the handling characteristics are increased, i.e., the contact lens is more difficult to tear or damage.

When adamantanyl acrylate is used to make the instant copolymers the tear strength is increased in the copolymers about twice as much as when isobornyl acrylate is used to make the instant copolymers. Therefore, adamantanyl acrylate is a particularly preferred monomer.

Menthyl acrylate may also be used to form the instant copolymers.

As mentioned the polycyclic esters of acrylic acid or methacrylic acid disclosed herein have a broad range of compatability with the particular polysiloxane monomers disclosed in the instant invention. This compatability results in optical clarity in the copolymer. The preferred range of the polycyclic ester of acrylic acid or methacrylic acid used in making the copolymer is from about 1% by weight to about 60% by weight based on the total weight of the copolymer.

Generally it was found that methacrylate monomers had very poor compatibility with the polysiloxane systems. However, it was found that the acrylates had much better compatibility but did not give the improvements in tensile strength and tear strength as found in the instant copolymers. The most preferred are isobornyl acrylate, adamantanyl acrylate, isopinocamphyl acrylate and dicyclopentadienyl acrylate. The comonomers resulted in copolymers which were unexpectedly far superior in their physical properties as compared with the homopolymers made from the polysiloxanes.

When the term "compatibility" used herein it is meant that, when the materials are compatible, these materials are optically clear, i.e., transparent and colorless.

When the polysiloxane monomers of the instant invention are copolymerized with about 10 percent to about 90 percent by weight based on the total weight of the copolymer, of a polycyclic ester of acrylic acid or methacrylic acid, a copolymer is formed which has an unexpectedly high tensile modulus of elasticity. Also the tear strength is unexpectedly high.

More specifically, the instant invention comprises a soft, flexible, fillerless, hydrolytically stable, biologically inert, transparent contact lens with the capability of transporting oxygen sufficiently to meet the requirements of the human cornea. The instant contact lens is made from a polysiloxane monomer $\alpha,\omega$ terminally bonded through divalent hydrocarbon groups to polymerized, free radical polymerizably activated, unsaturated groups copolymerized with from about 20 percent by weight to about 80 percent by weight based on the total weight of the solution of a monomer selected from the group consisting of isobornyl acrylate, adamantanyl acrylate, dicyclopentadienyl acrylate, menthyl acrylate and isopinocamphyl acrylate forming a polymer in a crosslinking network, having a tensile modulus of elasticity of from about 200 g/mm² to about 250 g/mm².

The three-dimensional network polymer products of the instant invention are readily prepared by means of conventional free radical polymerization techniques. The monomers together with about 0.05 to about 4.0 percent, preferably 0.05 to 2.0 percent by weight of a free radical initiator may be heated to a suitable temperature to initiate and complete polymerization, e.g., from about 30° C. to about 100° C. The polymerizable monomers can preferably be subjected at room temperature to radiation by UV light in the presence of suitable activators such as benzoin, acetophenone, benzophenone and the like for a sufficient time so as to form a three-dimensional polymer network.

The polymerization can be carried out directly in contact lens molds or can be cast into discs, rods, or sheets which can then be fabricated to a desired shape. Preferably the polymerization is carried out while the material is being spin cast, such as, taught in U.S. Pat. No. 3,408,429.

DESCRIPTION OF PREFERRED EMBODIMENTS

In accordance with the preferred embodiments of this invention shaped articles for use in biomedical applications including contact lenses are provided which are fabricated from three-dimensional network polymers comprising a polysiloxane monomer $\alpha,\omega$ terminally bonded through divalent hydrocarbon groups to polymerized, free radical polymerizably activated, unsaturated groups polymerized with from about 10 percent by weight to about 90 percent by weight, based on the total weight of the polymer, of a polycyclic ester of acrylic acid or methacrylic acid forming a polymer in a crosslinked network.

Preferably the monomeric polysiloxanes end-capped with activated unsaturated groups are copolymerized with monomers, such as, isobornyl acrylate, adamantanyl acrylate, dicyclopentadienyl acrylate to form copolymers for use in making contact lenses. These contact lenses have properties, such as an unexpectedly high modulus of elasticity of from about 200 g/mm² and an unexpectedly high tear strength of from about 5 g/mm to about 250 g/mm thickness.

The preferred amount of the polycyclic ester of acrylic acid or methacrylic acid is from about 20 percent to about 80 percent based on the total weight of the polymer.

The term polycyclic ester of acrylic acid is meant to include, but not limited to, isobornyl acrylate, adamantanyl acrylate, dicyclopentadienyl acrylate and isopinocamphyl acrylate.

When the terms "activated" or "free radical polymerizably activated" are used with the term "unsaturated groups" herein, it is meant that an unsaturated group which is activated is one which has a substituent which facilitates free radical polymerization. These activated unsaturated groups are polymerized to form the copolymer of the instant invention. Preferably, the activated groups used herein lend themselves to polymerization under mild conditions, such as ambient temperatures.

When the statement is made "a polysiloxane monomer $\alpha,\omega$ terminally bonded through divalent hydrocarbon groups to polymerized free radical polymerizably activated unsaturated groups" it is meant that the polysiloxane monomer as described herein has been attached to a compound having a divalent hydrocarbon group, such as methylene or propylene, etc. and then at each end of this compound is attached an activated unsaturated group such as methacryloxy, etc. and this then is the most preferred polysiloxane monomer. When these monomers are polymerized, e.g., crosslinked, the activated unsaturated groups are polymerized.

When the term monomer is used herein with the term polysiloxanes we mean to include polysiloxanes end-capped with polymerizable unsaturated groups. Preferably these monomers may be poly(organosiloxane) monomers and polyparaffinsiloxane monomers. The process of lengthening the siloxane portion of the monomer is referred to herein as siloxane ring insertion. The chain length of the polysiloxane center unit of the monomers may be as high as 800 or more.

When the term polymerization is used herein we refer to the polymerization of the double bonds of the siloxanes end-capped with polymerizable unsaturated groups along with a polycyclic ester of acrylic acid or methacrylic acid which results in a crosslinked three-dimensional polymeric network.

The relative hardness or softness of the contact lenses of this invention can be varied by decreasing or increasing the molecular weight of the monomeric polysiloxane end-capped with the activated unsaturated groups or by varying the percent and type of the comonomer. As the ratio of siloxane units to end-cap units increases, the softness of the material increases. Conversely, as this ratio decreases the rigidity and hardness of the material increases.

As is well established, the oxygen transportability of polysiloxanes is substantially greater in comparison to the conventional contact lens polymers such as polymethyl methacrylate (PMMA) or polyhydroxyethylmethacrylate (PHEMA). The oxygen transportability of the materials of this invention can be varied by altering the percentage of siloxane units in the polysiloxane monomer. For example, a high percentage of siloxane units results in a product more capable of transporting oxygen as compared with a lower percentage of siloxane units which results in a material with less ability to transport oxygen.

The preferred polysiloxane monomers are selected from the group consisting of a poly(organosiloxane) monomer having the formula

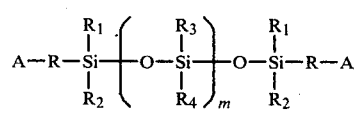

wherein A is an activated unsaturated group, R is a divalent hydrocarbon radical having from 1 to about 22 carbon atoms, $R_1$, $R_2$, $R_3$ and $R_4$ can be the same or different and each is one of a monovalent hydrocarbon radical or a halogen substituted monovalent hydrocarbon radical each having from 1 to about 12 carbon atoms and m is 0 or greater and a polyparaffinsiloxane monomer having the formula

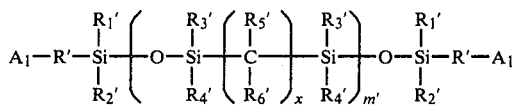

wherein $A_1$ is an activated unsaturated group; $R'$ is a divalent hydrocarbon radical having from 1 to about 22 carbon atoms; $R'_1$, $R'_2$, $R'_3$ and $R'_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R'_5$ and $R'_6$ can be the same or different and are selected from the group consisting of hydrogen, a hydrocarbon radical containing from 1 to about 12 carbon atoms, a carboxylic acid group, a carboxylic acid ester group represented by the formula

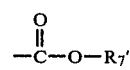

wherein $R'_7$ is selected from the group consisting of a hydrocarbon group containing from 1 to about 12 carbon atoms and a carboxylic acid amide represented by the formula

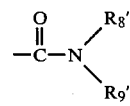

wherein $R'_8$ and $R'_9$ can be the same or different and each is selected from the group consisting of hydrogen and a hydrocarbon group containing from 1 to about 12 carbon atoms; x is 2 or greater and m' is 1 or greater.

The most preferred polysiloxane monomer is a poly(organosiloxane) monomer having the formula

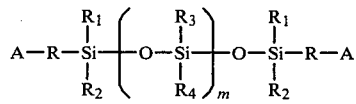

wherein A is one of
2-cyanoacryloxy

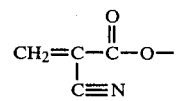

acrylonitryl

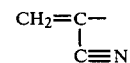

acrylamido

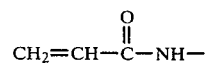

acryloxy methacryloxy

styryl

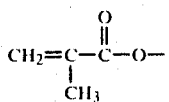

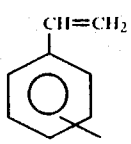

and

N—vinyl—2—pyrrolidinone—x—yl
wherein x may be 3, 4 or 5

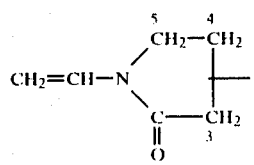

More preferably A is acryloxy or methacryloxy. However, other groups containing activated unsaturation can be readily employed, such groups being well known to those skilled in the art. Most preferably A is methacryloxy or acrylamido.

R may be preferably an alkylene radical. Therefore, preferably R is methylene, propylene, butylene, pentamethylene, hexamethylene, octamethylene, dodecylmethylene, hexadecylmethylene and octadecylmethylene; arylene radicals such as phenylene, biphenylene and the corresponding alkylene and arylene radicals. More preferably R is an alkylene radical having about 1,3 or 4 carbon atoms. Most preferably R is an alkylene radical having from about 3 to 4 carbon atoms, e.g., butylene.

Preferably, $R_1$, $R_2$, $R_3$ and $R_4$ are alkyl radicals having from 1 to 12 carbon atoms, e.g., methyl, ethyl, propyl, butyl, octyl, dodecyl and the like; cycloalkyl radicals, e.g., cyclopentyl, cyclohexyl, cycloheptyl and the like; mononuclear and binuclear aryl radicals, e.g., phenyl, naphthyl and the like; aralkyl radicals, e.g., benzyl, phenylethyl, phenylpropyl, phenylbutyl and the like; alkaryl radicals, e.g., tolyl, xylyl, ethylphenyl and the like; haloaryl radicals such as chlorophenyl, tetrachlorophenyl, difluorophenyl and the like; halo substituted lower alkyl radicals having up to about four alkyl carbon atoms such as fluoromethyl and fluoropropyl. More preferably $R_1$, $R_2$, $R_3$ and $R_4$ are methyl radicals.

The most preferred monomers, the activated unsaturated group end-capped poly(organosiloxane) monomers, employed in this invention can be prepared by equilibrating the appropriately substituted disiloxane, for example, 1,3-bis(4-methacryloxybutyl) tetramethyl disiloxane, with a suitable amount of a cyclic diorganosiloxane, e.g., hexamethyl cyclotrisiloxane, octaphenyl cyclotetrasiloxane, hexaphenylcyclotrisiloxane, 1,2,3-trimethyl- 1,2,3-triphenylcyclotrisiloxane, 1,2,3,4-tetramethyl- 1,2,3,4-tetraphenyl cyclotetrasiloxane and the like in the presence of an acid or base catalyst. The degree of softness, the physical properties such as tensile strength, modulus and percent elongation will determine the amount of cyclic diorganosiloxane equilibrated with the disiloxane. By increasing the amount of cyclic siloxane one increases m.

The reaction between a cyclic diorganosiloxane and disiloxanes, although not specifically disclosed for the disiloxanes employed in this invention as to provide the activated unsaturated groups as the end caps for polysiloxanes, is a conventional reaction and described by, for example, Kojima et al. Preparation of Polysiloxanes Having Terminal Carboxyl or Hydroxyl Groups, *J. Poly. Sci.*, Part A-1, Vol. 4, pp 2325-57 (1966) or U.S. Pat. No. 3,878,263 of Martin issued Apr. 15, 1975, incorporated herein by reference.

The following reactions represent the most preferred poly (organosiloxane) monomer materials of the instant invention. 1,3-bis(hydroxyalkyl) tetramethyl disiloxane dimethacrylates are prepared by the following reactions: (1) esterification with acryloyl or methacryloyl chloride or anhydride. For example, the following is with methacryloyl chloride:

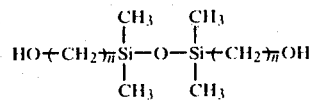

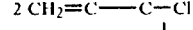

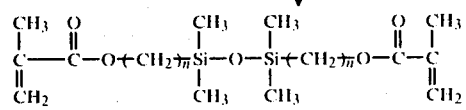

n preferably = 1,3, or 4
n most preferably = 3 or 4

(2) Another most preferred method of preparing 1,3-bis (hydroxyalkyl) tetramethyl disiloxane dimethacrylates is by transesterification with methyl methacrylate:

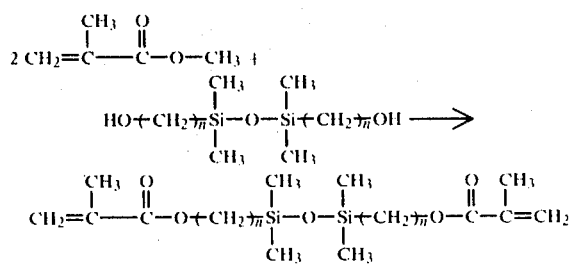

n—preferably = 1,3 or 4
n—most preferably = 3 or 4

Then the number of siloxane groups between the two methacrylate caps can be increased by a ring opening insertion reaction with X moles of octamethyl cyclotetrasiloxane as follows:

$$CH_2=C\overset{CH_3}{\underset{|}{\phantom{|}}}\overset{O}{\underset{\|}{-C}}-O(CH_2)_{\overline{n}}\overset{CH_3}{\underset{\underset{CH_3}{|}}{\underset{|}{Si}}}-O-\overset{CH_3}{\underset{\underset{CH_3}{|}}{\underset{|}{Si}}}(CH_2)_{\overline{n}}O-\overset{O}{\underset{\|}{C}}-\overset{CH_3}{\underset{|}{C}}=CH_2$$

n - preferably = 1, 3 or 4
n - most preferably = 3 or 4

X moles of 
$$\begin{array}{c} CH_3\phantom{-Si-O-Si}CH_3 \\ | \phantom{xxxxxxxxxxxx} | \\ CH_3-Si-O-Si-CH_3 \\ | \phantom{xxxxxxxxxxxx} | \\ O \phantom{xxxxxxxxxx} O \\ | \phantom{xxxxxxxxxxxx} | \\ CH_3-Si-O-Si-CH_3 \\ | \phantom{xxxxxxxxxxxx} | \\ CH_3\phantom{-Si-O-Si}CH_3 \end{array}$$

$$\overset{CH_3}{\underset{\underset{CH_2}{\|}}{\underset{|}{C}}}-\overset{O}{\underset{\|}{C}}-O(CH_2)_{\overline{n}}\overset{CH_3}{\underset{\underset{CH_3}{|}}{\underset{|}{Si}}}-O\left(\overset{CH_3}{\underset{\underset{CH_3}{|}}{\underset{|}{Si}}}-O\right)_m\overset{CH_3}{\underset{\underset{CH_3}{|}}{\underset{|}{Si}}}(CH_2)_{\overline{n}}O-\overset{O}{\underset{\|}{C}}-\overset{CH_3}{\underset{\underset{CH_2}{\|}}{\underset{|}{C}}}$$

n preferably = 1, 3 or 4
n most preferably = 3 or 4
m preferably = 50 to 800

The above structure i.e. a poly(organosiloxane) monomer, represents the most preferred polysiloxane monomer of the instant invention.

Preferably m is from about 50 to about 800. More preferably m is from about 50 to about 700.

When the term "soft" is used herein to describe the contact lenses of the instant invention it is meant that m, in the above formula, after polymerization, is more than 25, preferably from about 50 to about 800.

Also, the preferred polysiloxane monomers of this invention may be a polyparaffinsiloxane monomer having the formula:

$$A_1-R'-\overset{R_1'}{\underset{\underset{R_2'}{|}}{\underset{|}{Si}}}-\left(O-\overset{R_3'}{\underset{\underset{R_4'}{|}}{\underset{|}{Si}}}-\left(\overset{R_5'}{\underset{\underset{R_6'}{|}}{\underset{|}{C}}}\right)_x-\overset{R_3'}{\underset{\underset{R_4'}{|}}{\underset{|}{Si}}}\right)_{m'}-O-\overset{R_1'}{\underset{\underset{R_2'}{|}}{\underset{|}{Si}}}-R'-A_1$$

wherein $A_1$ is an activated unsaturated group; R' is a divalent hydrocarbon radical having from 1 to about 22 carbon atoms; $R'_1$, $R'_2$, $R'_3$ and $R'_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R'_5$ and $R'_6$ can be the same or different and are selected from the group consisting of hydrogen, a hydrocarbon radical containing from 1 to about 12 carbon atoms, a carboxylic acid group, a carboxylic acid ester group represented by the formula $$\overset{O}{\underset{\|}{-C}}-O-R_7'$$

wherein $R'_7$ is selected from the group consisting of a hydrocarbon group containing from 1 to about 12 carbon atoms and a carboxylic acid amide represented by the formula $$-\overset{O}{\underset{\|}{C}}-N\overset{R_8'}{\underset{R_9'}{\diagdown}}$$

wherein $R'_8$ and $R'_9$ can be the same or different and each is selected from the group consisting of hydrogen and a hydrocarbon group containing from 1 to about 12 carbon atoms; x is 2 or greater and m' is 1 or greater.

More preferably A' may be
2-cyanoacryloxy $$CH_2=\underset{\underset{C\equiv N}{|}}{C}-\overset{O}{\underset{\|}{C}}-O-$$

acrylonitryl $$CH_2=\underset{\underset{C\equiv N}{|}}{C}-$$

acrylamido $$CH_2=CH-\overset{O}{\underset{\|}{C}}-NH-$$

acryloxy $$CH_2=CH-\overset{O}{\underset{\|}{C}}-O-$$

methacryloxy $$CH_2=\underset{\underset{CH_3}{|}}{C}-\overset{O}{\underset{\|}{C}}-O-$$

styryl

CH=CH₂ on benzene ring and
N-vinyl-2-pyrrolidinone-x-yl
wherein x may be 3, 4 or 5

$$CH_2=CH-N\begin{array}{c}\overset{5}{CH_2}-\overset{4}{CH_2}\\ \diagup \phantom{xxxx} \diagdown \\ \phantom{xx} \diagdown \phantom{xx} | \\ \phantom{xxx}\underset{\|}{C}-\underset{3}{CH_2} \\ \phantom{xxx} O\end{array}$$

More preferably A' is acryloxy or methacryloxy. However, other groups containing activated unsaturation can be readily employed, such groups being well known to those skilled in the art. Most preferably A' is methacryloxy or acrylamido.

R' may be preferably an alkylene radical. Therefore, preferably R' is methylene, propylene, butylene, pentamethylene, hexamethylene, octamethylene, dodecylmethylene, hexadecylmethylene and octadecylmethylene; arylene radicals such as phenylene, biphenylene and the corresponding alkylene and arylene radicals. More preferably R' is an alkylene radical having about 1,3 or 4 carbon atoms. Most preferably R' is an alkylene radical having from about 3 to 4 carbon atoms, e.g., butylene.

Preferably R'$_1$, R'$_2$, R'$_3$ and R'$_4$ are alkyl radicals having from 1 to 12 carbon atoms, e.g., methyl, ethyl, propyl, butyl, octyl, dodecyl and the like; cycloalkyl radicals, e.g., cyclopentyl, cyclohexyl, cycloheptyl and the like; mononuclear and binuclear aryl radicals, e.g., benzyl, phenylethyl, phenylpropyl, phenylbutyl and the like; alkaryl radicals, e.g., tolyl, xylyl, ethylphenyl and the like; haloaryl radicals such as chlorophenyl, tetrachlorophenyl, difluorophenyl and the like; halo substituted lower alkyl radicals having up to about four alkyl carbon atoms such as fluoromethyl and fluoropropyl. More preferably R'$_1$, R'$_2$, R'$_3$ and R'$_4$ are methyl radicals and phenyl radicals, most preferably R'$_1$, R'$_2$, R'$_3$ and R'$_4$ are methyl radicals.

Preferably R'$_5$ and R'$_6$ are selected from the group consisting of hydrogen, a hydrocarbon containing from 1 to about 6 carbon atoms and a carboxylic acid group. More preferably R'$_5$ and R'$_6$ are selected from the group consisting of hydrogen and methyl.

Preferably R'$_7$ is a hydrocarbon group containing from 1 to about 6 carbon atoms. Most preferably R'$_7$ is methyl.

Preferably R'$_8$ and R'$_9$ are selected from the group consisting of hydrogen and a hydrocarbon containing from 1 to about 4 carbon atoms. Most preferably R'$_8$ and R'$_9$ are selected from the group consisting of hydrogen and methyl.

The polyparaffinsiloxanes monomers employed in this invention can be prepared by equilibrating the appropriately substituted disiloxane, for example, 1,3-bis(4-methacryloxybutyl) tetramethyl disiloxane, with a suitable amount of cyclic paraffinsiloxanes as described in Piccoli, et al, *J. Am. Chem. Soc.*, "Highly Strained Cyclic Paraffin-Siloxanes" Vol. 82, p. 1883–1885 (Apr. 20, 1960). The degree of softness, the physical properties such as tensile strength, modulus and percent elongation will determine the amount of cyclic organoparaffinsiloxane equilibrated with the disiloxane. By increasing the amount of cyclic paraffin-siloxane one increases m'.

The reaction between a cyclic paraffin-siloxane and disiloxanes, although not specifically disclosed for the disiloxanes employed in this invention as to provide the activated unsaturated groups as to the end caps for polyparaffinsiloxanes, is a conventional reaction and described by, for example, in Merker, U.S. Pat. No. 3,041,362 issued June 26, 1962 incorporated herein by reference.

The following reactions represent the most preferred monomeric materials of the instant invention. 1,3-bis(hydroxyalkyl) tetramethyl disiloxane dimethacrylates are prepared by the following reactions: (1) esterification with acryloyl or methacryloyl chloride or anhydride. For example, the following is with methacryloyl chloride:

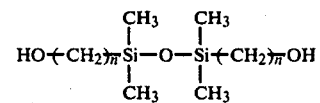

n' preferably = 1,3 and 4
n' most preferably = 3 or 4
+

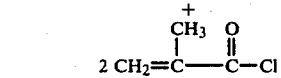

↓

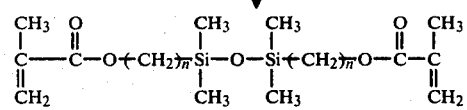

n' preferably = 1, 3 or 4
n' most preferably = 3 or 4

(2) Another most preferred method of preparing 1,3-bis(hydroxyalkyl) tetramethyl disiloxane dimethacrylates is by transesterification with methyl methacrylate:

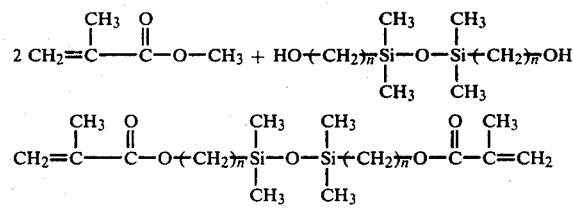

n' preferably = 1,3 or 4
n' most preferably = 3 or 4
+

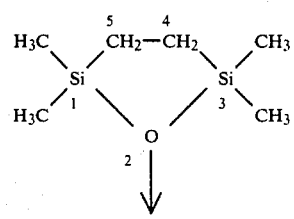

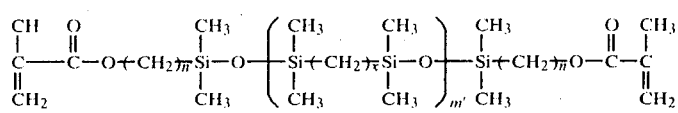

n'—preferably = 1,3 or 4
n'—most preferably = 3 or 4
m'—preferably = 20 to 500
x—most preferably = 2 to 3

The above structural formula represents the preferred polyparaffinsiloxane monomer of the instant invention.

The polysiloxane monomers when polymerized with a polycyclic ester of acrylic acid or methacrylic acid can be readily cured to cast shapes by conventional methods such as UV polymerization, or through the use of free radical initiators plus heat. Illustrative of free radical initiators which can be employed are bis (isopropyl) peroxydicarbonate, azobisisobutyronitrile, acetyl peroxide, lauroyl peroxide, decanoyl peroxide, benzoyl peroxide, tertiarybutyl peroxypivalate and the like.

In order to further control the properties of the copolymers of the instant invention one can polymerize a mixture of the polysiloxane monomers comprising polysiloxane monomers having a low value of m and polysiloxane monomers having a high value for m with a polycyclic ester of acrylic acid or methacrylic acid. When m in the polysiloxane monomers has a relatively high value, i.e., above 20, the resulting contact lenses or biomedical devices are soft, oxygen transporting, flexible, hydrolytically stable, biologically inert, transparent, resilient, and do not need fillers to improve the mechanical properties. All the monomers should have preferably a molecular weight low enough so that the viscosity is low enough to spin cast the monomers, e.g., about 175 stokes or below as measured in Gardner viscosity tubes. Preferably m' is about 20 to 500.

The preferred polycyclic esters of acrylic acid include isobornyl acrylate, adamantanyl acrylate, dicyclopentadienyl acrylate and isopinocamphyl acrylate.

The contact lenses of the instant invention, which are made from polymers which contain polysiloxane monomers and polycyclic esters of acrylic acid or methacrylic acid, have an unexpectedly higher modulus and unexpectedly higher tear strength as compared to contact lens made from homopolymers made from the instant polysiloxane monomers.

Preferably the polycyclic esters of acrylic acid or methacrylic acid are present in amounts from about 20 percent by weight to about 80 percent by weight based on the total weight of the copolymer.

Further advantages of using the polysiloxane monomers are (1) the advantages of using activated vinyl terminal groups to cure the siloxane material which permits rapid cure at preferably room temperature if suitable initiators are used. This is desirable since the preferred method of casting the contact lens is spin casting. (2) No fillers are needed to get useful physical strength as is common with most silicone resins. This is desirable since the use of fillers requires that other possibly undesirable materials be added to the composition in order to correct the refractive index of the contact lenses. (3) Furthermore, the polysiloxane monomers and the copolymers of the instant invention are oxygen transporting. This is important if the material is to be used for contact lenses. The human cornea requires about $2 \times 10^{-6}$ cm$^3$/(sec.cm$^2$atm.) of oxygen through the contact lens as reported by Hill and Fatt, *American Journal of Optometry and Archives of the American Academy of Optometry*, Vol. 47, p. 50, 1970. When m or m' is at least about 4 the chain of siloxane is long enough in the instant composition to exceed the oxygen transportability requirements of the cornea and other living tissue. However, in specific situations m or m' may be as low as 1. Because of the unique properties of the contact lenses of the instant invention m or m' in the polysiloxane monomers may be great enough to allow sufficient oxygen transportability and at the same time will retain its desirable properties of elasticity, tear resistance, flexibility, resilience and softness.

When the term "oxygen transportability" or "oxygen transporting" is used in the instant application it is meant that the material will allow sufficient transmission of oxygen through itself to supply the necessary oxygen requirements of the human cornea and other living tissue. The oxygen requirement for the human cornea, as mentioned, is about $2 \times 10^{-6}$ cm$^3$/(sec. cm$^2$ atm.). The oxygen transportability was determined by a special test procedure described in conjunction with Example III herein. (4) These soft contact lenses or biomedical devices are placed into an aqueous solution, e.g., in the eye, or during the disinfecting step, i.e., water plus heat, the lenses will not change in chemical composition, i.e., hydrolyze and cause the lenses to change shape resulting in an undesirable change in optics or shape. (5) The contact lenses of the instant invention are also resilient. When the term "resilient" is used herein it is meant that after the lenses have been deformed the lenses or devices will return quickly to their original shape. (6) The lenses are preferably made by spin casting, e.g., by the method as disclosed in U.S. Pat. No. 3,408,429. Monomers which have too high a viscosity cannot be spin cast. However, generally the higher the molecular weight of the polysiloxane monomers the longer the siloxane chain length, i.e., the larger the value of m or m', and as a consequence the more desirable the properties are for the preferred contact lenses of the instant invention, made from these polysiloxane monomers. The longer the chain length and the higher the molecular weight the higher the viscosity of the monomers. However, if spin casting is to be used the viscosity of the polysiloxane monomers must be such that these materials can be spin cast. The polysiloxane monomers of the instant invention can have molecular weights high enough to give all the desirable properties when polymerized but low enough to be spin cast while still in the monomeric form. The preferred weight average molecular weight is from about 4,000 to 60,000 for the polysiloxane monomers of the instant invention. (7) The contact lenses of the instant invention are soft. By the use of the term "soft" in the instant application it is meant that the lenses should have a Shore hardness of about 60 or below on the A scale. (8) The preferred contact lenses of the instant invention should be flexible. When the term "flexible" is used herein, it is meant that the contact lens is capable of being folded or bent back upon itself without breaking.

The most preferred contact lens of the instant invention is a soft, fillerless, oxygen transporting, flexible, hydrolytically stable, biologically inert, transparent, resilient polymeric contact lens comprising a polysiloxane monomer, $\alpha,\omega$ terminally bonded through divalent hydrocarbon groups to polymerized free radical polymerizably activated unsaturated groups polymerized with preferably isobornyl acrylate. The polysiloxane monomer used to make the copolymer from which the contact lens is made has the preferred formulas selected from the group consisting of a poly (organosiloxane) monomer with the formula

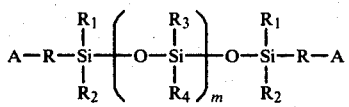

wherein A is selected from the group consisting of methacryloxy and acryloxy, R is an alkylene radical having from about 3 to about 4 carbon atoms and m is from about 50 to 800 and a polyparaffinsiloxane monomer with the formula

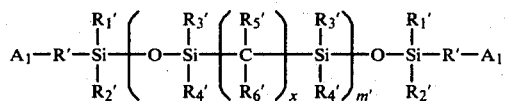

wherein $A_1$ is selected from the group consisting of methacryloxy and acryloxy; R' is an alkylene radical having from 3 to 4 carbon atoms; R'$_1$, R'$_2$, R'$_3$ and R'$_4$ can be the same or different and are monovalent hydrocarbon radicals having from 1 to about 12 carbon atoms; R'$_5$ and R'$_6$ are hydrogen atoms x is 2 or 3 and m' is 20 to 500.

The most preferred contact lenses of the instant invention, as mentioned, have an oxygen transport rate of at least about $2\times 10^{-6}$ cm$^3$/(sec. cm$^2$ atm.), are hydrolytically stable, biologically inert, transparent, resilient, and have a softness preferably of about 60 or below on the Shore hardness A scale. Most preferably the Shore hardness should be 25 to 35 on the A scale. The tensile modlulus of elasticity is at least about 200 g/mm$^2$ preferable from about 200 g/mm$^2$ to about 100,000 g/mm$^2$ and the tear strength is at least about 5.0 g/mm thickness preferable from about 5.0 g/mm to about 250 g/mm thickness.

High tensile modulus of elasticity is desirable for strength and durability.

High tear strength is desirable to prevent damage to the contact lens (1) due to tearing during patient use, i.e., the removing and the placing of the lens in the eye, and (2) to prevent damage to the lens during the disinfecting step.

If the material is to be used as contact lenses then the Shore hardness and modulus may be related to the comfort of the lenses to the wearer when used on the human eye.

Another advantage of the preferred embodiment, i.e., soft contact lenses, of the instant invention is that lenses made from the polymers of the instant invention can be made large enough to cover the entire cornea of the eye resulting in more comfort. Hard contact lenses, such as PMMA lenses, have to be made smaller due to their poor oxygen transportability. Furthermore, the larger the lenses, the easier it is to locate the optical center of the lenses. The larger the lens the easier it is to maintain the optical axis which is required in making special lenses for people with particular eye problems, e.g., for those persons with astigmatism. Another advantage of the preferred soft lenses of the instant invention is that the instant preferred soft lenses have a softness similar to HEMA lenses but, in addition, and most importantly, are more oxygen permeable, i.e., are capable of transporting more oxygen. HEMA lenses are not oxygen permeable or capable of transporting oxygen to a degree necessary to meet all the requirements of the human cornea.

When the word "oxygen permeable" is used herein it means that the instant copolymers will transport oxygen at a rate of at least about $2\times 10^{-6}$ cm$^3$/(sec. cm$^2$ atm.).

While the polymers of the instant invention can be used to prepare contact lenses these polymers can also be employed for other uses, such as, shaped articles for use in biomedical applications. These polymers can be used to make biomedical devices, i.e., shaped articles, such as dialyzer diaphragms, to prepare artificial kidneys and other biomedical implants, such as disclosed in Wichterle, U.S. Pat. No. 2,976,576 and Wichterle, U.S. Pat. No. 3,220,960. The instant polymers can be used in preparing therapeutic bandages as disclosed in Shephard, U.S. Pat. No. 3,428,043. The instant polymers can also be used in preparing medical surgical devices, e.g., heart valves, vessel substitutes, intrauterine devices, membranes and other films, dialyzer diaphragms, catheters, mouth guards, denture liners and other such devices as disclosed in Shephard U.S. Pat. No. 3,520,949 and Shephard U.S. Pat. No. 3,618,231. The instant polymers can be used to modify collagen to make blood vessels, urinary bladders and other such devices as disclosed in Kliment U.S. Pat. No. 3,563,925. The instant polymers can be used to make catheters as disclosed in Shephard U.S. Pat. No. 3,566,874. The polymers can be used as semipermeable sheets for dialysis, artificial dentures and all of such disclosures as set forth in Stoy U.S. Pat. No. 3,607,848. The instant polymers can be used in ophthalmic prostheses and all other uses disclosed in Wichterle U.S. Pat. No. 3,679,504.

When the terms "shaped article for use in biomedical applications" or "biomedical device" are used herein it is meant that the materials disclosed herein have physiochemical properties rendering them suitable for prolonged contact with living tissue, blood or the mucous membrane such as would be required for biomedical shaped articles, such as, surgical implants, blood dialysis devices, blood vessels, artificial ureters, artificial breasts tissue and membranes intended to come in contact with body fluid outside of the body, for example, membranes for kidney dialysis and heart/lung machines, and the like. It is known that blood, for example, is rapidly damaged in contact with artificial surfaces. The design of a synthetic surface which is antithrombogenic and nonhemolytic to blood is necessary for prosthesis and devices used with blood. The polymers are compatible with living tissue.

The polymers disclosed herein can be boiled and/or autoclaved in water without being damaged whereby sterilization may be achieved. Thus, an article formed from the instant polymers disclosed herein may be used in surgery where an article compatible with living tissue or with the mucous membrane may be used.

The physical properties, i.e., tensile strength and modules, as recorded in Table I were measured on an Instron Tester ASTM D1708. The samples had no prior conditioning and were in standard "dog bone" shapes which were cut from 0.2 mm thick film. The speed is 0.25 inches per minute.

The tear strength as recorded in Table I was conducted, using ASTM 1938 and is initial tear strength.

The oxygen transport rate as shown in Table I is determined by the following technique. Two chambers are filled with water at 32° C. and are connected by a common passageway over which is placed the material to be tested. Nitrogen purged water is pumped into both chambers until the oxygen concentration is very low (~0.4 ppm). Then aerated water (oxygen concentration ~8 ppm) is introduced into the lower chamber. There is located in the upper chamber an electrode sensitive to oxygen concentration. This measures the apparent oxygen transport rate from the lower chamber through the material to be tested into the oxygen depleted upper chamber. The apparent oxygen transport rate of a membrane 0.1 mm thick is recorded in Table I for the various copolymers.

$cm^{-1}$. NMR spectra agreed with the proposed structure:

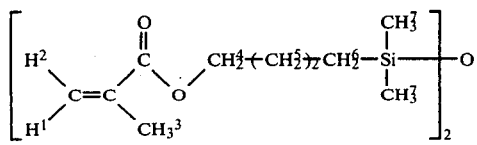

1,3-bis(4-methacryloxy butyl) tetramethyl disiloxane.

| Proton | ppm | Integrated Area | Multiplicity |
|---|---|---|---|
| $H^1$ | $7.0_5$ | 1 | singlet |
| $H^2$ | $6.5_0$ | 1 | singlet |
| $H^3$ | $3.0_0$ | 3 | singlet |
| $H^4$ | $5.1_5$ | 2 | triplet |
| $H^5$ | 2.7 | 4 | multiplet |
| $H^6$ | $1.6_5$ | 2 | triplet |
| $H^7$ | $1.2_0$ | 6 | singlet |

TABLE I

| WT. % | COMPOSITION | TENSILE STRENGTH g/mm$^2$ | MODULUS g/mm$^2$ | ASTM 1938 INITIAL TEAR STRENGTH g/mm$^2$ THICKNESS | CM$^3$/SEC.-CM$^2$ ATM. O$_2$ TRANSPORT |
|---|---|---|---|---|---|
| 100%* | Polysiloxane Homopolymer | 75 | 88 | 3 | 12 × 10$^{-6}$ |
| 30% | Isobornyl Acrylate | 200 | 550 | 20 | 13 × 10$^{-6}$ |
| 70%* | | | | | |
| 30% | Adamantanyl Acrylate | 445 | 1,338 | 49 | 5.8 × 10$^{-6}$ |
| 70%* | | | | | |
| 30%* | Menthyl Acrylate | | | | |
| 70%* | | 130 | 212 | 16 | 5.9 × 10$^{-6}$ |
| 30% | Isopinocamphyl Acrylate | 180 | 307 | 17 | 5.9 × 10$^{-6}$ |
| 70%* | | | | | |
| 30% | Dicyclopentadienyl Acrylate | 279 | 283 | 7 | 5.6 × 10$^{-6}$ |
| 70%* | | | | | |

*Monomer α, ω-Bis(4-methacryloxybutyl), poly(dimethyl siloxane)
The above copolymers are prepared the same as illustrated in Example III The following examples are illustrative only and should not be construed as limiting the invention. All parts and percents referred to herein are on a weight basis and all viscosities are measured at 25° C. unless otherwise specified.

EXAMPLE I 557 g of 1,3-bis(4-hydroxybutyl) tetramethyl disiloxane, 634 g of dry pyridine and 2 liters of hexane are charged to a 5 liter reaction flask equipped with a mechanical stirrer and drying tube. The mixture is chilled to 0° C. and then 836 g of methacryloyl chloride is added dropwise. The mixture is agitated continuously overnight. The reaction solution is extracted consecutively with 10% water solutions of HCl and NH$_3$ in order to remove excess reagents and pyridine hydrochloride. The resulting solution of the product in hexane is dried with anhydrous MgSO$_4$, filtered, and solvent removed at reduced pressure. About 459 g (55% yield) of 1,3-bis(4-methacryloxy butyl) tetramethyl disiloxane is collected. The structure is confirmed by infrared spectra, proton magnetic resonance spectra and elemental analysis. IR spectra shows no intense hydroxyl band between 3100 and 3600 $cm^{-1}$ but does show strong methacrylate absorptions at 1640 and 1720

Elemental analysis gave 13.6% Si (Calc. 13.5%), 58.1% C (calc. 57.9%, and 9.4%H (calc. 9.2%). The product was a clear, colorless, fragrant fluid.

EXAMPLE II 489.75 g of octamethylcylotetrasiloxane and 10.25 g of 1,3-bis(4-methacryloxybutyl) tetramethyl disiloxane, as prepared in Example I, are charged into a reaction vessel equipped with a mechanical stirrer. About 25 g of Fuller's Earth and 1.35 ml of conc. H$_2$SO$_4$ are mixed and added to the vessel with continuous stirring while bubbling dry N$_2$ through the reaction mixture. The charge is warmed to 60° C. and stirred for two days, at which time the viscous fluid is neutralized with Na$_2$CO$_3$, diluted with hexanes, and filtered. The hexanes/monomer solution is washed with water, dried with M$_g$SO$_4$ (anhydrous) and solvent removed at reduced pressure. Low molecular weight unreacted cyclic siloxanes are removed by heating the monomer to 110° C. at 0.2 mm Hg in a rotary evaporator. The product obtained is an odorless, colorless, clear fluid of 8.5 stokes viscosity measured in Garnder Viscosity tubes. The monomer comprised about 240 repeating Me$_2$·SiO' units. Fluid collected during the devolatilizing of the product shows no methacrylate absorptions in IR spectra and could not be cured.

IR spectra of the monomer shows a slight methacrylate absorption and broad siloxane absorptions between 1000 and 1100 cm$^{-1}$, indicative of linear poly(dimethyl siloxanes) with the following formula:

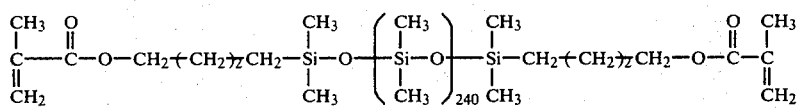

EXAMPLE III

To 10.59 gms of the monomer, as prepared in Example II, is added 4.5 gms of isobornyl acrylate (IBOA) and 0.15 gm of diethoxy acetophenone (DEAP). After mixing, this solution is placed between 3"×4" glass plates, separated by a 0.2 mm peripheral gasket, thereby forming a cell. The material is then irradiated with UV light for two hours. After irradiation, the plates are separated and the film removed. This film is optically clear and tough. All the various copolymers with test results shown in Table I were prepared as in this Example.

The oxygen transport rate is determined by the following technique. Two chambers are filled with water at 32° C. and are connected by a common passageway over this is placed the material to be tested. Nitrogen purged water is pumped into both chambers until the oxygen concentration is very low (~0.4 ppm). Then aerated water (oxygen concentration ~8 ppm) is introduced into the lower chamber. There is located in the upper chamber an electrode sensitive to oxygen concentration. This measures the apparent oxygen transport rate from the lower chamber through the material to be tested into the oxygen depleted upper chamber. The apparent oxygen transport rate of a membrane 0.1 mm thick as prepared in Example III is $13 \times 10^{-6}$ cm$^3$(O$_2$)/(sec. cm.$^2$ atm.).

We claim:

1. A soft, flexible, fillerless, hydrolytically stable, biologically inert, transparent contact lens with the capability of transporting oxygen sufficiently to meet the requirements of the human cornea comprising a polysiloxane monomer, $\alpha,\omega$ terminally bonded through divalent hydrocarbon groups to polymerized, free radical polymerizably activated, unsaturated groups copolymerized with from about 20 percent by weight to about 80 percent by weight, based on the total weight of the solution, of a monomer selected from the group consisting of a polycyclic ester of acrylic acid and a polycyclic ester of methacrylic acid, forming a polymer in a crosslinked network having a tensile modulus of elasticity of at least about 200 g/mm$^2$ with a tear strength of at least about 5.0 g/mm thickness.

2. A contact lens according to claim 1 wherein the polycyclic ester monomer is a polycyclic ester of acrylic acid.

3. A contact lens according to claim 2 wherein the polycyclic ester of acrylic acid is selected from the group consisting of isobornyl acrylate, adamantanyl acrylate, dicyclopentadienyl acrylate, menthyl acrylate and isopinocamphyl acrylate.

4. The contact lens according to claim 3 wherein the polycyclic ester of acrylic is isobornyl acrylate.

5. The contact len according to claim 4 wherein isobornyl acrylate is present in amounts from about 20 weight percent to about 80 weight percent.

6. The contact lens according to claim 1 wherein the tensile modulus of elasticity is from about 200 g/mm$^2$ to about 100,000 5/mm$^2$.

7. The contact lens according to claim 1 wherein the tear strength is from about 5.0 g/mm to about 250 g/mm thickness.

8. The contact lens according to claim 1 wherein the polysiloxane monomer is selected from the group consisting of a monomer having the formula

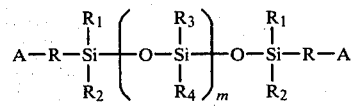

wherein A is an activated unsaturated group, R is a divalent hydrocarbon radical having from 1 to about 22 carbon atoms, R$_1$, R$_2$, R$_3$ and R$_4$ can be the same or different and is selected from the group consisting of a monovalent hydrocarbon radical or a halogen substituted monovalent hydrocarbon radical each having from 1 to 12 carbon atoms and m is 0 or greater and the monomer having the formula

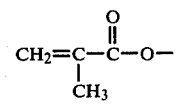

wherein A$_1$ is an activated unsaturated group; R' is a divalent hydrocarbon radical having from 1 to about 22 carbon atoms; R'$_1$, R'$_2$, R'$_3$ and R'$_4$ can be the same or different and are selected from the group consisting of a monovalent hydrocarbon radical having from 1 to about 12 carbon atoms and a halogen substituted monovalent hydrocarbon radical having from 1 to about 12 carbon atoms; R'$_5$ and R'$_6$ can be the same or different and are selected from the group consisting of hydrogen, a hydrocarbon radical containing from 1 to about 12 carbon atoms, a carboxylic acid group, a carboxylic acid group represented by the formula

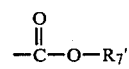

wherein R'$_7$ is selected from the group consisting of a hydrocarbon group containing from 1 to about 12 carbon atoms and a carboxylic acid amide represented by the formula

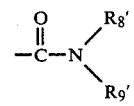

wherein $R'_8$ and $R'_9$ can be the same or different and each is selected from the group consisting of hydrogen and a hydrocarbon group containing from 1 to about 12 carbon atoms; x is 2 or greater and m' is 1 or greater.

9. The contact lens according to claim 8 wherein the polysiloxane monomer has the formula

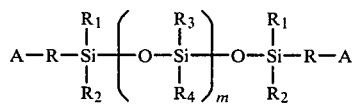

wherein A is an activated unsaturated group, R is a divalent hydrocarbon radical having from 1 to about 22 carbon atoms, $R_1$, $R_2$, $R_3$ and $R_4$ can be the same or different and selected from the group consisting of a monovalent hydrocarbon radical or a halogen substituted monovalent hydrocarbon radical, each having from 1 to 12 carbon atoms and m is 0 or greater.

10. The contact lens according to claim 9 wherein m is a number from 50 to about 800.

11. The contact lens according to claim 10 wherein m is a number of from about 50 to about 700.

12. The contact lens according to claim 11 which has a Shore hardness of 60 or below on the Shore hardness scale A.

13. The contact lens according to claim 12 which has a Shore hardness of 25 to 35 on the Shore hardness scale A.

14. The contact lens according to claim 9 which has an oxygen transportability of at least $2 \times 10^{-6}$ cm$^3$/(sec. cm$^2$ atm).

15. The contact lens according to claim 9 wherein A is selected from the group consisting of 2-cyanoacryloxy, acrylonitryl, acrylamido, acryloxy, methacryloxy, styryl, N-vinyl-2-pyrrolidinone-3-yl, N-vinyl-2-pyrrolidinone-4-yl and N-vinyl-2-pyrrolidinone-5-yl and R is an alkylene radical and $R_1$, $R_2$, $R_3$ and $R_4$ is an alkyl radical having from 1 to 10 carbon atoms.

16. The contact lens according to claim 15 wherein the alkylene radical has from about 1 to about 4 carbon atoms.

17. The contact lens according to claim 16 wherein the alkylene radical has from about 3 to about 4 carbon atoms.

18. The contact lens according to claim 9 wherein $R_1$, $R_2$, $R_3$ and $R_4$ are selected from the group consisting of a methyl radical and a phenyl radical.

19. The contact lens according to claim 18 wherein $R_1$, $R_2$, $R_3$ and $R_4$ are methyl radicals.

20. The contact lens according to claim 8 wherein the polysiloxane monomer has the formula

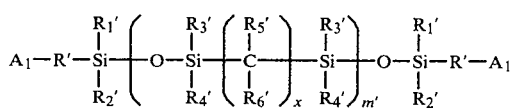

wherein $A_1$ is an activated unsaturated group; R' is a divalent hydrocarbon radical having from 1 to about 22 carbon atoms, $R'_1$, $R'_2$, $R'_3$ and $R'_4$ can be the same or different and are selected from the group consisting of a monovalent hydrocarbon radical having from 1 to about 12 carbon atoms and a halogen substituted monovalent hydrocarbon radical having from 1 to about 12 carbon atoms, $R'_5$ and $R'_6$ can be the same or different and are selected from the group consisting of hydrogen, a hydrocarbon radical containing from 1 to about 12 carbon atoms, a carboxylic acid group, a carboxylic acid ester group represented by the formula

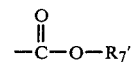

wherein $R'_7$ is selected from the group containing from 1 to about 12 carbon atoms and a carboxylic acid amide represented by the formula

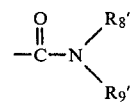

wherein $R'_8$ and $R'_9$ can be the same or different and each is selected from the group consisting of hydrogen and a hydrocarbon group containing from 1 to about 12 carbon atoms; x is 2 or greater and m' is 1 or greater.

21. The contact lens according to claim 20 wherein m' is a number of from 20 to about 500.

22. The contact lens according to claim 20 wherein the oxygen transportability is at least $2 \times 10^{-6}$ cm$^3$/(sec. cm$^2$ atm.).

23. The contact lens according to claim 22 which has a Shore hardness of 60 or below on the Shore hardness scale A.

24. The contact lens according to claim 20 wherein x is a number from 2 to 3.

25. The contact lens according to claim 20 where $A_1$ is selected from the group consisting of 2-cyanoacryloxy, acrylonitryl, acrylamido, acryloxy, methacryloxy, styryl, N-vinyl-2-pyrrolidinone-3-yl, N-vinyl-2-pyrrolidinone-4-yl and N-vinyl-2-pyrrolidinone-5-yl and R' is an alkylene radical and $R'_1$, $R'_2$, $R'_3$ and $R'_4$ are alkyl radicals having from 1 to 10 carbon atoms.

26. The contact lens according to claim 25 wherein the alkylene radical has from about 1 to about 4 carbon atoms.

27. The contact lens according to claim 26 wherein the alkylene radical has from about 3 to about 4 carbon atoms.

28. The contact lens according to claim 20 wherein $R'_1$, $R'_2$, $R'_3$ and $R'_4$ are selected from the group consisting of a methyl radical and a phenyl radical.

29. The contact lens according to claim 28 wherein $R'_1$, $R'_2$, $R'_3$ and $R'_4$ are methyl radicals.

30. The contact lens according to claim 29 wherein $R'_5$ and $R'_6$ are selected from the group consisting of hydrogen and methyl.

31. The contact lens according to claim 30 wherein x is a number from 2 to 3.

* * * * *

UNITED STATES PATENT AND TRADEMARK OFFICE
CERTIFICATE OF CORRECTION

PATENT NO. : 4,254,248

DATED : March 3, 1981

INVENTOR(S) : Gary D. Friends et al.

It is certified that error appears in the above—identified patent and that said Letters Patent is hereby corrected as shown below:

| | |
|---|---|
| Col. 4, line 63, | delete the first word "synethesize" and insert ---synthesize---. |
| Col. 5, line 19, | delete the word "mentioneed" and insert ---mentioned---. |
| Col. 19, line 68, | delete "$2 \times 10^6$" and insert ---$2 \times 10^{-6}$---. |
| Col. 22, line 68, | delete "modules" and insert ---modulus---. |
| Col. 24, line 66, | delete "Garnder" and insert ---Gardner---. |
| Col. 26, line 1, | being Claim 5, line 1, delete "len" and insert ---lens---. |
| Col. 26, line 6, | being Claim 6, line 3, delete "$5/mm^2$" and insert ---$g/mm^2$---. |

UNITED STATES PATENT AND TRADEMARK OFFICE
CERTIFICATE OF CORRECTION

PATENT NO. : 4,254,248

DATED : March 3, 1981

INVENTOR(S) : Gary D. Friends et al

It is certified that error appears in the above-identified patent and that said Letters Patent are hereby corrected as shown below:

Col. 26, lines 36-41, being Claim 8, line 13, delete the formula " $-CH_2=C-C-O-$ " and insert the formula

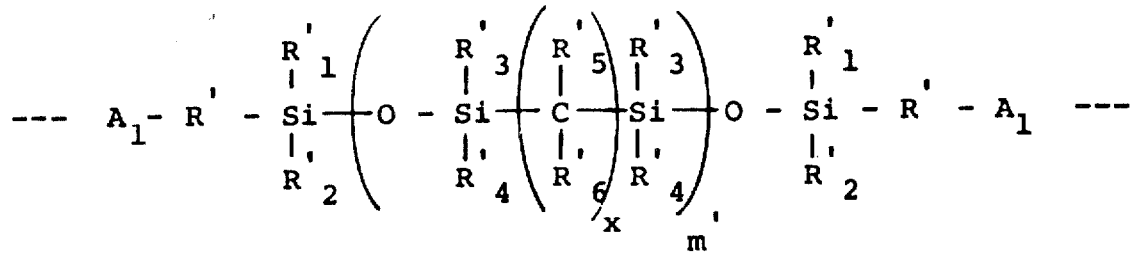

Signed and Sealed this

Eleventh Day of August 1981

[SEAL]

Attest:

Attesting Officer

GERALD J. MOSSINGHOFF

Commissioner of Patents and Trademarks